(12) United States Patent
Sinelli et al.

(10) Patent No.: US 7,857,469 B2
(45) Date of Patent: Dec. 28, 2010

(54) EXTERIOR REARVIEW MIRROR FOR MOTOR VEHICLES

(75) Inventors: Gary J. Sinelli, Royal Oak, MI (US); Paul R. Henion, Port Huron, MI (US); Douglas J. Wilson, Ft. Gratiot, MI (US); Timothy Jaquays, Washington, MI (US)

(73) Assignee: SMR Patents S.a.r.l., Luxembourg (LU)

( * ) Notice: Subject to any disclaimer, the term of this patent is extended or adjusted under 35 U.S.C. 154(b) by 237 days.

(21) Appl. No.: 11/968,989

(22) Filed: Jan. 3, 2008

(65) Prior Publication Data

US 2009/0174959 A1 Jul. 9, 2009

(51) Int. Cl.
*G02B 5/10* (2006.01)

(52) U.S. Cl. ...................................... 359/864
(58) Field of Classification Search ................. 359/864, 359/866
See application file for complete search history.

(56) References Cited

U.S. PATENT DOCUMENTS

| | | | |
|---|---|---|---|
| 5,005,962 A * | 4/1991 | Edelman | 359/864 |
| 6,199,993 B1 | 3/2001 | Mou | |
| 6,315,419 B1 | 11/2001 | Platzer, Jr. | |
| 6,522,451 B1 | 2/2003 | Lynam | |
| 6,717,712 B2 | 4/2004 | Lynam et al. | |
| 7,097,312 B2 | 8/2006 | Platzer, Jr. | |
| 7,167,294 B2 | 1/2007 | Lynam et al. | |

* cited by examiner

*Primary Examiner*—Euncha P Cherry
(74) *Attorney, Agent, or Firm*—Reising Ethington P.C.

(57) ABSTRACT

An exterior rearview mirror assembly for a motor vehicle is disclosed having a bracket which is fixedly secured to the motor vehicle. A mirror casing is secured to the bracket. The mirror casing defines a primary opening. A primary mirror is disposed within the primary opening and provides a view rearward of the motor vehicle through a primary field of view. A spotting mirror is disposed adjacent the primary mirror. The spotting mirror is defined by a single radius of curvature differing from the primary mirror such that the spotting mirror provides a secondary field of view rearward of the motor vehicle.

18 Claims, 4 Drawing Sheets

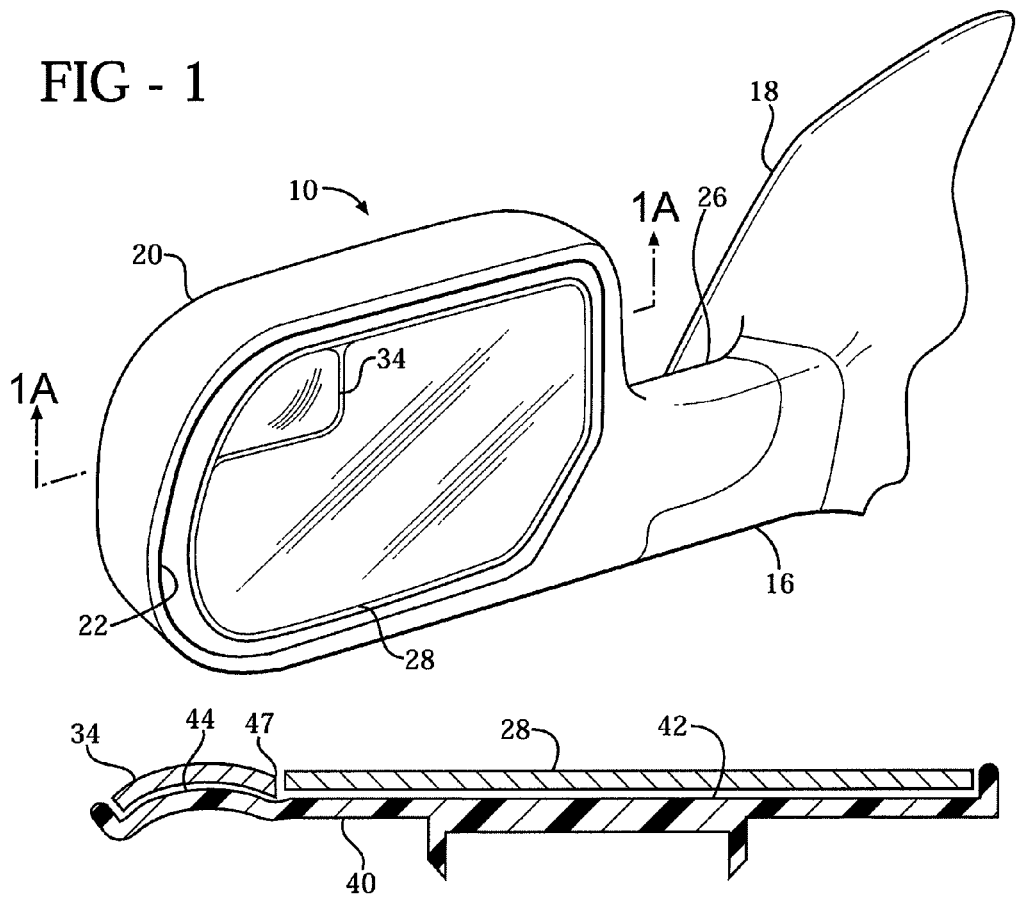
FIG - 1
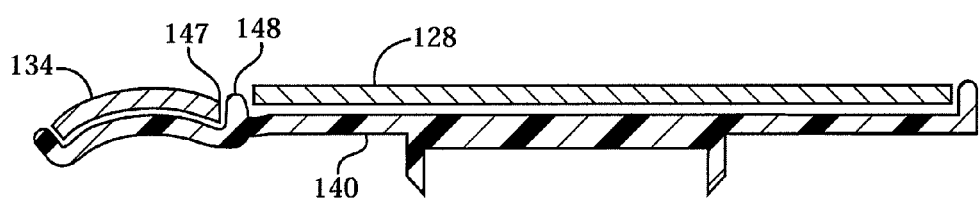
FIG - 1A
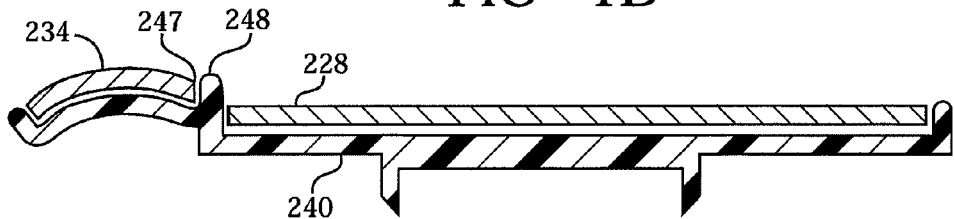
FIG - 1B
FIG - 1C

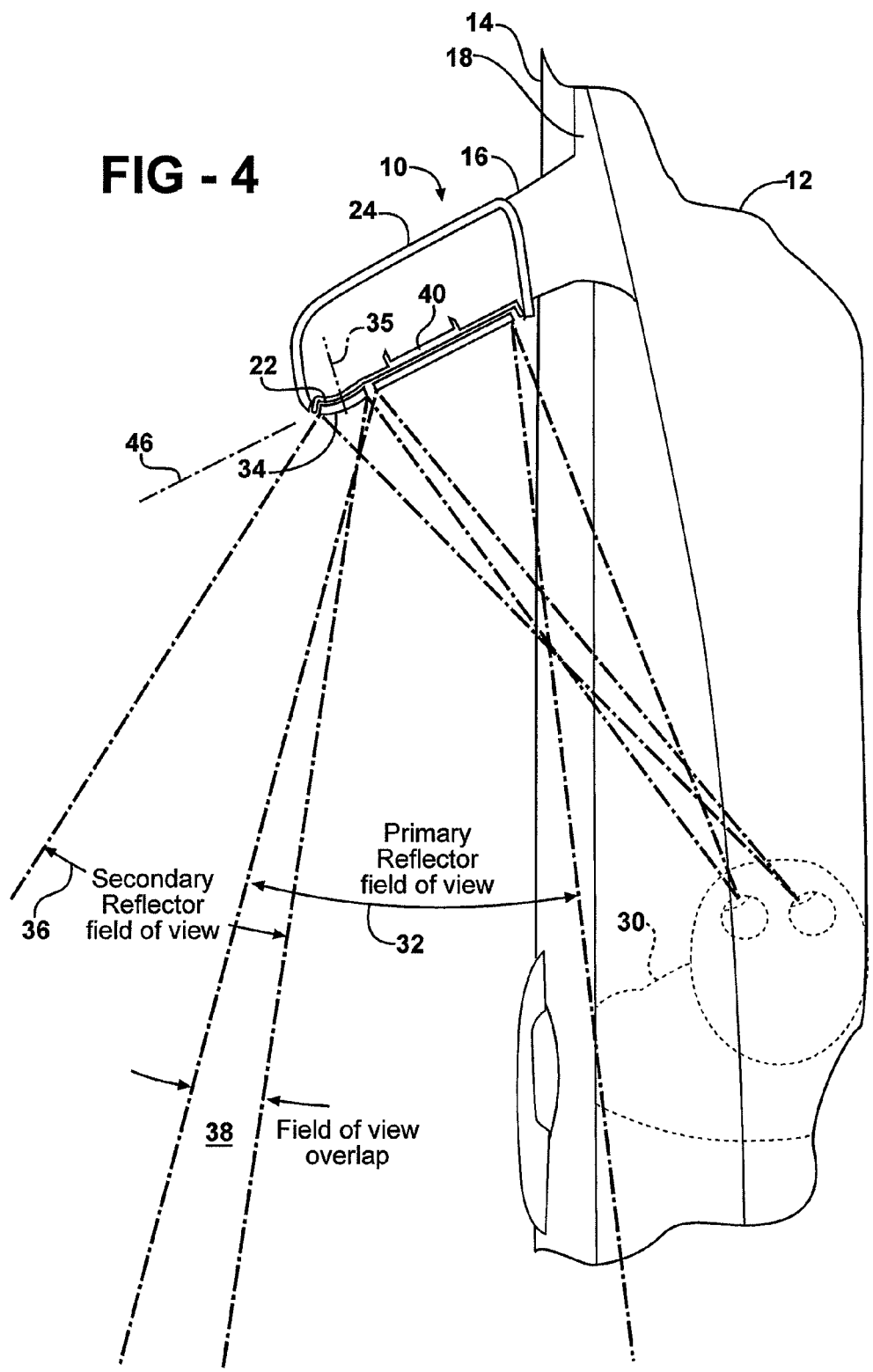

EXTERIOR REARVIEW MIRROR FOR MOTOR VEHICLES

BACKGROUND ART

1. Field of the Invention

The invention relates to exterior rear view mirror assemblies for motor vehicles. More particularly, the invention relates to exterior rear view mirror assemblies that include a plurality of mirrors with differing fields of view.

2. Background of the Invention

Multiple mirrors in a rear view mirror assembly are common. The multiple mirrors include a primary mirror and what is typically referred to as a secondary or spotting mirror. This secondary reflector is located somewhere adjacent the primary reflective surface and is used to aid the user of the motor vehicle to increase his field of view around the motor vehicle.

The spotter mirror is typically curved to increase the field of view rearward of the motor vehicle. Positioning of the auxiliary mirror with regard to the primary mirror is difficult and requires precision to ensure that the field of view for each of the mirrors or reflective surfaces are aligned properly to maximize the ability of the user to increase the field of view rearward of the motor vehicle.

SUMMARY OF THE INVENTION

An exterior rearview mirror assembly for a motor vehicle is disclosed having a bracket which is fixedly secured to the motor vehicle. A mirror casing is secured to the bracket. The mirror casing defines a primary opening. A primary mirror is disposed within the primary opening and provides a view rearward of the motor vehicle through a primary field of view. A spotting mirror is disposed adjacent the primary mirror. The spotting mirror is defined by a single radius of curvature differing from the primary mirror such that the spotting mirror provides a secondary field of view rearward of the motor vehicle.

BRIEF DESCRIPTION OF THE DRAWINGS

Advantages of the invention will be readily appreciated as the same becomes better understood by reference to the following detailed description when considered in connection with the accompanying drawings, wherein:

FIG. 1 is a perspective view of one embodiment of the invention, partially cutaway;

FIGS. 1A through 1C are cross-sectional views of three separate embodiments taken along lines 1A-1A of FIG. 1;

FIG. 4 is a top view of a motor vehicle with the invention secured thereto and schematically identifying the fields of view created by the mirror assembly.

DETAILED DESCRIPTION OF THE PREFERRED EMBODIMENT

Figure 2:
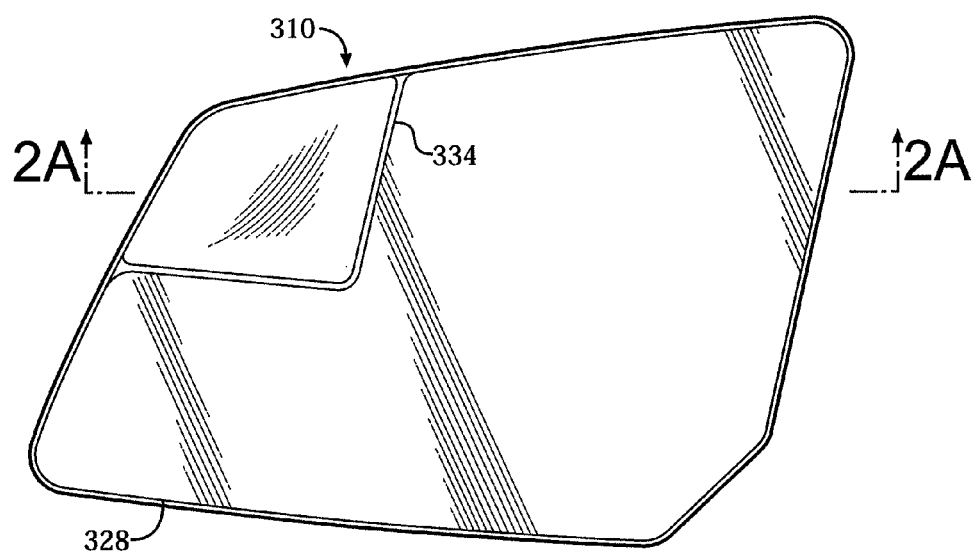
FIG. 2 is a rearview of another embodiment of the invention.

Referring to FIG. 1, an exterior rearview mirror assembly is generally indicated at 10. The exterior rearview mirror assembly 10 is fixedly secured to a motor vehicle 12 on a side 14 thereof. This is best seen in FIG. 4. While only one exterior rearview mirror assembly 10 is shown, it should be appreciated by those skilled in the art that a second exterior rearview mirror assembly 10 may be fixedly secured to a side opposite the side 14 of the motor vehicle 12.

The exterior rearview mirror assembly 10 includes a bracket, graphically represented in FIGS. 1 and 4 by a bracket cover 16. The bracket 16 is mounted to the side 14 of the motor vehicle 12. The mounting thereof is covered by a sail 18, which is an aesthetic piece that also is able to improve the aerodynamics of the exterior rearview mirror assembly 10.

The exterior rearview mirror assembly 10 also includes a mirror casing 20. The mirror casing 20 is secured to the bracket 16. The mirror casing 20 defines a primary opening 22. The primary opening 22 faces rearward of the motor vehicle 12. For purposes of this disclosure, the direction rearward is the direction opposite the direction in which the motor vehicle 12 is going when it is driving in a forward direction. Therefore, the mirror casing 20 includes a forward surface 24 which extends forward of the exterior rearview mirror assembly 10 (best seen in FIG. 4). The mirror casing 20 is generally closed but for the primary opening 22. In many embodiments, the mirror casing 20 includes exterior lighting units for illuminating the mirror casing 20 depending on the particular situation. Examples of lighting units include turn signals and ground illumination lighting units. Such units may be incorporated into the mirror casing without deviating from the invention. The mirror casing 20 also includes a neck 26 which extends out from the mirror casing 20 and is received by the brackets 16. It should be appreciated by those skilled in the art that the function of the neck 26 may be assumed by the brackets 16 resulting in a mirror casing 20 without a neck 26.

Referring to all the Figures, the exterior rearview mirror assembly 10 includes a primary mirror 28 which is disposed within the primary opening 22. The primary mirror 28 provides a view rearward of the motor vehicle 12. An operator 30 using the primary mirror 28 will see a primary field of view 32 as shown in FIG. 4.

The exterior rearview mirror assembly 10 also includes a spotting or secondary mirror 34. The spotting mirror 34 is disposed adjacent the primary mirror 28. The spotting mirror 34 defines a single radius of curvature which is different from the primary mirror 28 such that the spotting mirror 34 provides a secondary field of view 36 rearward of the motor vehicle. The spotting mirror 34 is defined by the single radius of curvature and that radius is a defined, finite number. The primary mirror 28 is substantially planar or flat defining a primary plane and, therefore, has a radius of curvature that is infinite. As such, the radius of curvature for the spotting mirror 34 is different than the radius of curvature for the primary mirror 28. In the embodiment shown, the spotting mirror 34 has a radius of curvature that is less than the radius of curvature of the primary mirror 28. The exterior rearview mirror assembly 10 is configured such that the primary field of view 32 and the secondary field of view 36 overlap to create an overlap field of view 38. The overlap field of view 38 is desired to ensure that the operator 30 does not miss anything between the perspective fields of view 32, 36 of the primary 28 and spotting 34 mirrors.

The exterior rearview mirror assembly 10 includes a single mirror support 40 which supports both the primary mirror 28 and the spotting mirror 34 with respect to each other within the primary opening 22. More specifically, the single mirror support 40 is used to position the primary mirror 28 and the spotting mirror 34 such that the primary field of view and the secondary field of view 36 create an overlap field of view 38.

By using a single mirror support 40, the relationship between the secondary field of view 36 and the primary field of view 32 is constant and is not dependent upon the quality of the assembling procedures.

Referring to FIG. 1A, the single mirror support 40 defines a primary portion 42 and a spotting portion 44. The primary portion 42 includes an area substantially equal to the area defined by the primary mirror 28. The primary mirror 28 is fixedly secured to the primary portion 42 of the single mirror support 40. Likewise, the spotting portion 44 of the single mirror support 40 has the spotting mirror 34 fixedly secured thereto. The primary portion 42 and the spotting portion 44 of the single mirror support 40 have radii of curvature which mirror the radii of curvature for the spotting mirror 34 and the primary mirror 28 respectively. More specifically, the primary portion 42 defines a primary plane 46 that is substantially flat and the spotting portion 44 defines a spotting mirror radius of curvature that is substantially equal to the single radius of curvature 35. The primary plane 46 and the single radius of curvature 35 are best seen in FIG. 4.

Referring to FIGS. 1A through 1C, alternative embodiments of the invention are shown. In particular, the alternative embodiments, wherein referenced numerals are offset by 100, the spotting mirror 34 is positioned with respect to the primary mirror 28 differently through each of the three embodiments. In the preferred embodiment, FIG. 1A, the spotting mirror 34 is disposed in a position such that an edge 47 of the spotting mirror 34 is coplanar with the primary mirror 28. In FIG. 1B, the spotting mirror 134 is forward of or recessed to the primary mirror 28. And in FIG. 1C, the spotting mirror 234 is rearward or proud of the primary mirror 128. In the first and second alternative embodiments shown in FIGS. 1B and 1C, respectively, a divider 148, 248 extends between the spotting mirror 134, 234, and the primary mirror 128, 228. The divider 148, 248 is an extension of the single mirror support 140, 240. The divider 148, 248 provides a visible separation to the two different reflective elements.

Figure 2A:
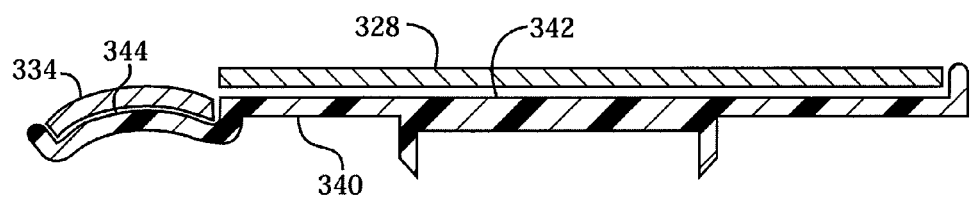
FIGS. 2A and 2B are cross-sectional rearview taken along lines 2A-2A of FIG. 2.
Figure 2B:
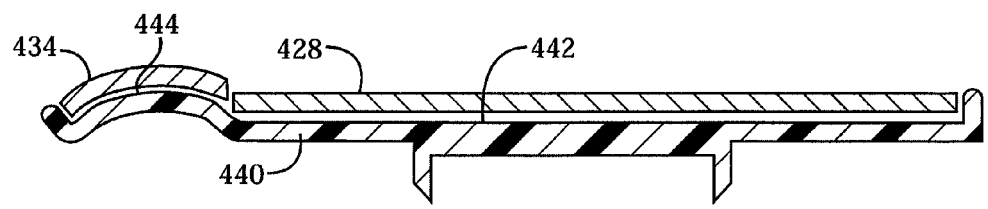

Referring to FIGS. 2, 2A and 2B, third and fourth alternative embodiments are generally shown. In these embodiments, the divider 148, 248 is not present. In these embodiments, the spotting mirror 34 and the primary mirror 28 appear to be more of a unified structure without the division therebetween.

Figure 3:
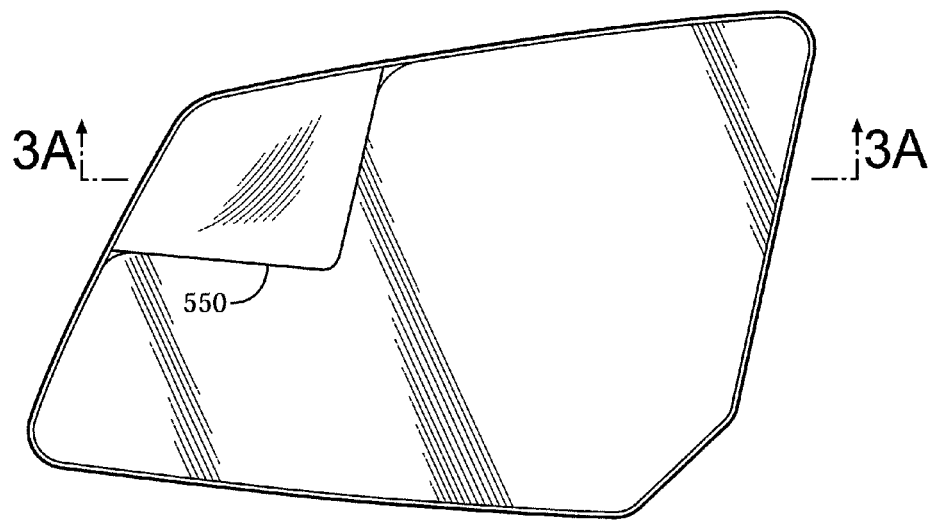
FIG. 3 is a rearview of another alternative embodiment of the invention.
Figure 3A:
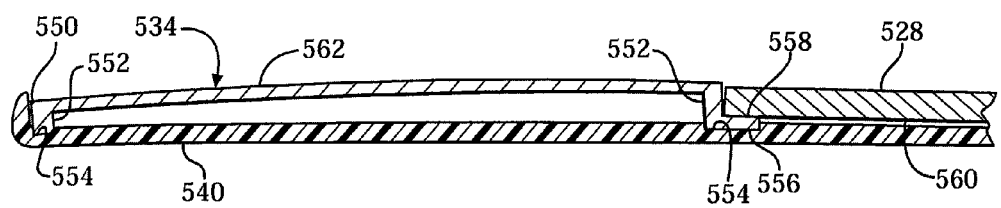
FIGS. 3A and 3B are cross-sectional rearview taken along lines 3A-3A of FIG. 3.
Figure 3B:
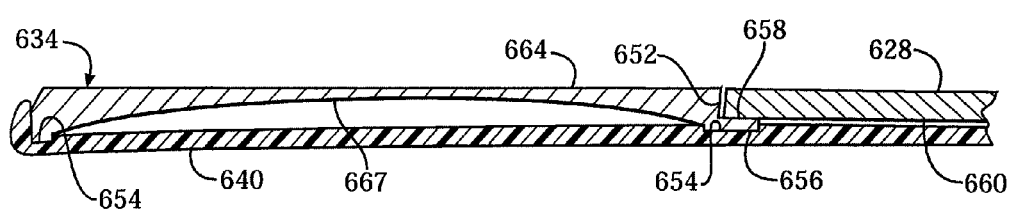

Referring to FIGS. 3, 3A and 3B, fifth and sixth embodiments of the invention are shown. FIG. 3 represents a side view of both embodiments shown in FIGS. 3A and 3B. In FIG. 3A, the spotting mirror 534 defines a periphery 550. The periphery 550 includes a rim flange 552 that extends thereabout the periphery 550. The rim flange 552 extends underneath a portion of the primary mirror 528.

The single mirror support 540 defines a flange channel 554 which receives a portion of the rim flange 552 therein. The rim flange 552 being seated within the flange channel 554 and partially covered by the primary mirror 528 accurately positions the spotting mirror 534 with respect to the primary mirror 528.

The rim flange 552 includes a rim extension 556. The rim extension 556 extends out from the rim flange 552 perpendicularly thereto. A top face 558 of the rim extension 556 is the surface that is disposed adjacent a back side 560 of the primary mirror 528.

In FIG. 3A, the spotting mirror 534 defines an outer reflective surface 562 that defines a single radius of curvature. This outer reflective surface is a coated surface that includes a chrome or chrome-like material.

Referring to FIG. 3B, the spotting mirror 634 includes an outer flat surface 664 and an inner reflective surface 667. The inner reflective surface 667 is coated with a reflective material. In this seventh embodiment, the spotting mirror 634 is fabricated from a translucent polymer resin to allow the light impinging thereupon to pass through the spotting mirror 634 with as little refraction as possible. The inner reflective surface 667 is curved such that the reflection on the inner reflective surface will create the necessary secondary field of view which will overlap the primary field of view created by the primary mirror 628.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. An exterior rearview mirror assembly for a motor vehicle, said exterior rearview mirror assembly comprising:
    a bracket fixedly secured to the motor vehicle;
    a mirror casing secured to said bracket, said mirror casing defining a primary opening;
    a single mirror support movably secured within said mirror casing disposed adjacent said primary opening;
    a primary mirror fixedly secured to said single mirror support and disposed within said primary opening for providing a view rearward of the motor vehicle through a primary field of view; and
    a spotting mirror fixedly secured to said single mirror support and disposed adjacent said primary mirror, said spotting mirror defined by a single radius of curvature differing from said primary mirror such that said spotting mirror provides a second field of view rearward of the motor vehicle, such that said first field of view of said primary mirror overlaps said second field of view of said spotting mirror.

2. An exterior rearview mirror assembly as set forth in claim 1 wherein said single mirror support defines a primary portion for having said primary mirror fixedly secured thereto and a spotting portion for having said spotting mirror fixedly secured thereto.

3. An exterior rearview mirror assembly as set forth in claim 2 wherein said primary portion of said single mirror support defines a primary plane that is substantially flat.

4. An exterior rearview mirror assembly as set forth in claim 3 wherein said spotting portion of said single mirror support defines a spotting mirror support radius of curvature substantially equal to said single radius of curvature.

5. An exterior rearview mirror assembly as set forth in claim 4 wherein said spotting portion is forward of said primary plane.

6. An exterior rearview mirror assembly as set forth in claim 4 wherein said spotting portion is substantially rearward of said primary plane.

7. An exterior rearview mirror assembly for a motor vehicle, said exterior rearview mirror assembly comprising:
    a bracket fixedly secured to the motor vehicle;
    a mirror casing secured to said bracket, said mirror casing defining a primary opening;
    a primary mirror disposed within said primary mirror for providing a view rearward of the motor vehicle through a primary field of view;
    a spotting mirror disposed adjacent said primary mirror, said spotting mirror defining a periphery and including a rim flange extending thereabout; and a single mirror support for supporting said primary mirror and said spotting mirror with respect to each other and within said primary opening, said single mirror support including a flange channel for receiving a portion of said rim flange therein.

8. An exterior rearview mirror assembly as set forth in claim 7 wherein a portion of said rim flange extends between said primary mirror and said single mirror support to accurately position said spotting mirror with respect to said primary mirror.

9. An exterior rearview mirror assembly as set forth in claim 8 wherein a portion of said rim flange includes a rim extension extending perpendicularly to said rim flange.

10. An exterior rearview mirror assembly as set forth in claim 9 wherein said spotting mirror defines an outer reflective surface having a single radius of curvature.

11. An exterior rearview mirror assembly as set forth in claim 9 wherein said spotting mirror defines an inner reflective surface.

12. An exterior side mirror assembly as set forth in claim 11 wherein said inner reflective surface defines a single radius of curvature.

13. An exterior rearview mirror assembly as set forth in claim 12 wherein said spotting mirror is fabricated from a translucent polymer resin.

14. An exterior rearview mirror assembly as set forth in claim 13 wherein said inner reflective surface is coated with a reflective material.

15. An exterior rearview mirror assembly as set forth in claim 14 wherein said reflective material is chrome.

16. An exterior rearview mirror assembly for a motor vehicle, said exterior rearview mirror assembly comprising:
a bracket fixedly secured to the motor vehicle;
a mirror casing secured to said bracket, said mirror casing defining a primary opening;
a primary mirror disposed within said primary opening for providing a view rearward of the motor vehicle through a primary field of view, said primary mirror defining a primary plane;
a spotting mirror spaced apart from said primary mirror, said spotting mirror extending through a secondary plane different from said primary plane; and
a divider extending between said primary mirror and said spotting mirror to separate said primary and secondary mirrors visually.

17. An exterior rearview mirror assembly as set forth in claim 16 wherein said spotting mirror is forward of said primary plane.

18. An exterior rearview mirror assembly as set forth in claim 16 wherein said spotting mirror is rearward of said primary plane.

* * * * *